(12) United States Patent
Cominsky (10) Patent No.: US 10,994,823 B2
(45) Date of Patent: May 4, 2021

(54) BEADED PANELS AND METHOD OF FORMING BEADED PANELS

(71) Applicant: The Boeing Company, Chicago, IL (US)

(72) Inventor: Kenneth D. Cominsky, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 110 days.

(21) Appl. No.: 16/158,028

(22) Filed: Oct. 11, 2018

(65) Prior Publication Data

US 2020/0115026 A1   Apr. 16, 2020

(51) Int. Cl.
| | |
|---|---|
| *B64C 1/06* | (2006.01) |
| *B29C 70/34* | (2006.01) |
| *B21D 22/00* | (2006.01) |
| *B29L 31/30* | (2006.01) |
| *B64C 1/00* | (2006.01) |

(52) U.S. Cl.
CPC ............ *B64C 1/066* (2013.01); *B29C 70/345* (2013.01); *B21D 22/00* (2013.01); *B29L 2031/3076* (2013.01); *B64C 2001/0072* (2013.01); *B64C 2001/0081* (2013.01)

(58) Field of Classification Search
CPC ............ B64C 1/066; B64C 2001/0072; B64C 2001/0081; B64C 2001/0054; B64C 1/10; B29C 70/345; B21D 22/00; B29L 2031/3076; E04C 2/22; E04C 2/326; E04C 2/08
See application file for complete search history.

(56) References Cited

U.S. PATENT DOCUMENTS

| | | | | |
|---|---|---|---|---|
| 5,904,992 A | * | 5/1999 | Yasui | ................... B23K 20/023 428/593 |
| 9,199,713 B2 | | 12/2015 | Thomas et al. | |
| 2012/0052247 A1 | | 3/2012 | Pook et al. | |
| 2013/0287995 A1 | * | 10/2013 | Deobald | .................. B29C 70/30 428/120 |

FOREIGN PATENT DOCUMENTS

| | | |
|---|---|---|
| DE | 2924864 A1 | 1/1981 |
| EP | 2824031 A2 | 1/2015 |

OTHER PUBLICATIONS

European Search Report; Application EP19199187; dated Mar. 10, 2020.

* cited by examiner

*Primary Examiner* — Brian Handville
(74) *Attorney, Agent, or Firm* — Duft & Bornsen, PC (57) ABSTRACT

Beaded panels and method of forming beaded panels. A beaded panel as described herein includes a base structure comprising a sheet of material, and beads that comprise a protrusion on a first side of the base structure, and a concavity on an opposing second side of the base structure. A geometry of the beads comprises a center section having a conic shape about a longitudinal axis, flared sections symmetric about the center section along the longitudinal axis, and a transition section that curves outward from a base of the center section and the flared sections to blend with a flat surface on the first side of the base structure.

20 Claims, 12 Drawing Sheets

BEADED PANELS AND METHOD OF FORMING BEADED PANELS

FIELD

This disclosure relates to the field of panels, and more particularly, to panels upon which beads have been formed to supplement the stiffness of the panel.

BACKGROUND

Thin, flat sheets of material are used in a variety of applications as structural components, such as in aircraft, aerospace vehicles, automobiles, floating vessels, etc. The light-weight properties of thin sheets of material may be desirable for applications, but the bending stiffness of the thin sheets may be less than desirable for these same applications. To improve the stiffness of a thin sheet, bead stiffeners may be added to the thin sheet to form a beaded panel. A bead stiffener (referred to herein as a "bead") is an alteration to the cross-section of a sheet to improve stiffness or rigidity. For example, a bead stiffener in a metal sheet may comprise a feature that is stamped into the sheet so that the bead protrudes from one side of the sheet and is recessed on the other side of the sheet. The static and dynamic characteristics of a sheet are enhanced by bead stiffeners without any increase in the mass of the beaded panel. The bending or flexural stiffness of a sheet depends on the material properties of the sheet and its cross-section geometry. By changing the geometry of the sheet with the bead stiffeners, the stiffness of the sheet is increased. In addition to bead geometry, the stiffness of a sheet may be further altered by bead location and bead orientation.

SUMMARY

Embodiments described herein provide for an improved bead design for a beaded panel. A bead as described herein protrudes from a flat surface on one side of a beaded panel, and is recessed on the opposing side of the panel. The bead generally has a bow-tie shape, and the three-dimensional (3D) surface of the bead is smooth. Also, there is a smooth transition between the bead and the flat surface of the beaded panel. This design avoids angular or sharp-cornered features on the surface of the bead itself or at locations where the bead blends into the flat surface, which may create stress concentrations that are prone to cracking when an out-of-plane force is applied to a beaded panel. This design is also optimized for manufacturability using a variety of materials, such as metals, composites (e.g., fiber-reinforced thermoplastic), etc.

One embodiment is a beaded panel comprising a base structure comprising a sheet of material, and beads that comprise a protrusion on a first side of the base structure, and a concavity on an opposing second side of the base structure. A geometry of the beads comprises a center section having a conic shape about a longitudinal axis, and flared sections symmetric about the center section along the longitudinal axis. Each transverse cross-section of the flared sections is smooth. The geometry further comprises a transition section that curves outward from a base of the center section and the flared sections to blend with a flat surface on the first side of the base structure.

In another embodiment, the flared sections include a proximal end that abuts an end of the center section, and a distal end that is opposite the proximal end. A width of the flared sections increases from the proximal end to the distal end.

In another embodiment, the flared sections transition from a conic shape at the proximal end to a flat shape at the distal end.

In another embodiment, the conic shape of the proximal end of the flared sections corresponds with the conic shape of the center section.

In another embodiment, a tangential plane of the flared sections has a maximum slope in the range of 10-20 degrees in relation to the flat surface along the longitudinal axis.

In another embodiment, a radius of curvature of the transition section is constant along a length and width of the transition section.

In another embodiment, the material comprises a fiber-reinforced composite material.

In another embodiment, the beaded panel is installed in an aircraft.

Another embodiment is a beaded panel comprising a base structure comprising a sheet of material, and beads that comprise a protrusion on a first side of the base structure, and a concavity on an opposing second side of the base structure. Along a length of the beads, a width of the beads increases from a middle region to opposing end regions to resemble a bow-tie shape. An outer surface of the beads in three-dimensions is continuously smooth along the entirety of the length and the width of the beads.

In another embodiment, a profile of the beads is curvilinear in plan view.

In another embodiment, a geometry of the beads comprises a center section having a conic shape, flared sections symmetric about the center section along the length of the beads, and a transition section that curves outward from a base of the center section and the flared sections to blend with a flat surface on the first side of the base structure.

In another embodiment, a tangential plane of the flared sections has a maximum slope in the range of 10-20 degrees in relation to the flat surface along the length of the beads.

In another embodiment, the flared sections transition from a conic shape to a flat shape along the length of the beads.

Another embodiment comprises a method of forming a beaded panel. The method comprising designing a bead model in three-dimensions for beads of the beaded panel by: defining a base plane for the bead model, defining a center section for the bead model having a conic shape that is symmetric on the base plane about a longitudinal axis and having a height in relation to the base plane, defining flared sections for the bead model in relation to the base plane that are symmetric about the center section along the longitudinal axis, defining an elevated plane above the base plane, identifying a truncated shape of the bead model above the elevated plane, and defining a transition section for the bead model to transition the center section of the truncated shape and the flared sections of the truncated shape to the base plane. The method further comprises acquiring a tool having surface features that correspond with the bead model, and forming the beaded panel to include the beads using the tool.

In another embodiment, acquiring the tool comprises fabricating the surface features on the tool based on the bead model.

In another embodiment, forming the beaded panel comprises stamping the beads in a sheet of metal material with the tool.

In another embodiment, forming the beaded panel comprises stamping the beads in a sheet of a fiber-reinforced composite material with the tool.

In another embodiment, forming the beaded panel comprises laying up one or more layers of a fiber-reinforced composite material on the surface features of the tool, and curing the layers of the fiber-reinforced composite material.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments of the present invention are now described, by way of example only, with reference to the accompanying drawings. The same reference number represents the same element or the same type of element on all drawings.

DETAILED DESCRIPTION

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure, and are to be construed as being without limitation. As a result, this disclosure is not limited to the specific embodiments or examples described below, but by the claims and their equivalents.

Figure 1:
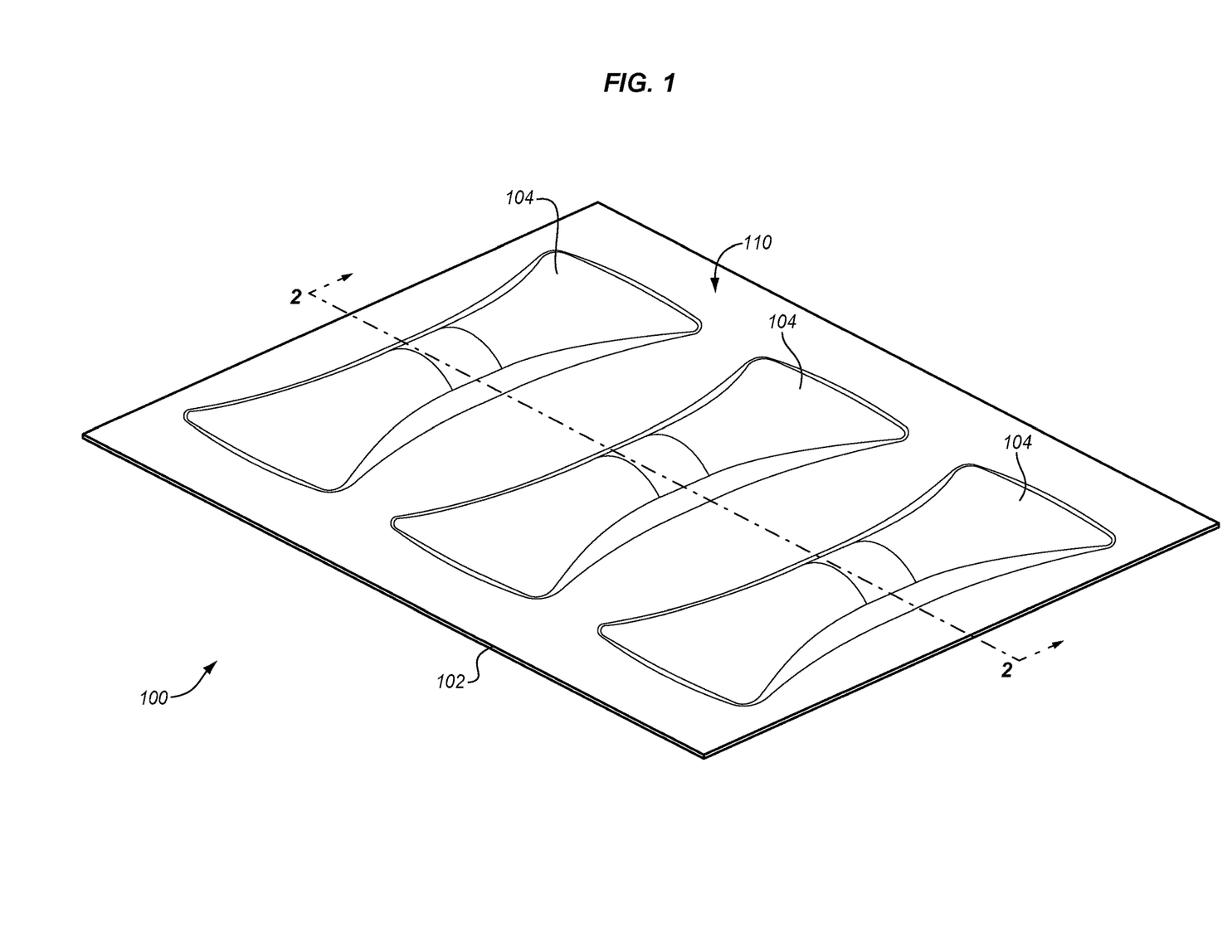
FIG. 1 is a perspective view of a beaded panel in an illustrative embodiment.

FIG. 1 is a perspective view of a beaded panel 100 in an illustrative embodiment. Beaded panel 100 includes a base structure 102 (also referred to as a web), and one or more beads 104 formed on base structure 102. Base structure 102 is a sheet or plate of material that is generally planar or flat. Base structure 102 may be referred to as a "thin" sheet of material having a thickness that is a small fraction of its length and width. Base structure 102 may be made from a metal material, such as an aluminum alloy, magnesium alloy, titanium alloy, etc., a fiber-reinforced composite material, or other materials that are light-weight yet strong. A composite material as described herein is comprised of reinforcement layers (e.g., carbon fibers, glass fibers, polymeric aramid fibers, etc.), and a matrix (e.g., a polymer resin) that bind the reinforcement layers. Examples of a composite material include a fiber-reinforced plastic (FRP) or a carbon fiber-reinforced plastic (CFRP). Base structure 102 may be rectangular as shown in FIG. 1, or may have other geometries. Base structure 102 may have a uniform thickness along its length and width, or may have a varying thickness.

A bead 104 is an alteration to a cross-section of base structure 102 to supplement the rigidity or stiffness of base structure 102. As illustrated in FIG. 1, beads 104 protrude from a top side 110 of base structure 102, and generally have a bow-tie shape. Beads 104 may be arranged in an array, and the number, size, and orientation of beads 104 may be specified to provide desired stiffness.

Figure 2:
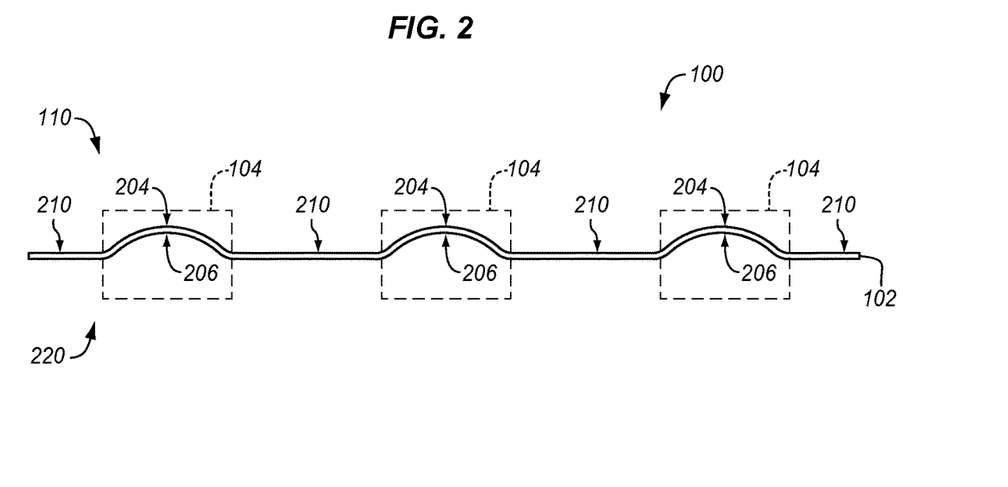
FIG. 2 is a cross-sectional view of a beaded panel in an illustrative embodiment.

FIG. 2 is a cross-sectional view of beaded panel 100 in an illustrative embodiment. The view in FIG. 2 is across cutting plane "2-2" in FIG. 1. This figure illustrates how beads 104 alter the cross-section of base structure 102. As described above, base structure 102 is generally flat or planar, and the top side 110 of base structure 102 has a flat surface 210. Beads 104 comprise a protrusion 204 or bulge on top side 110 of base structure 102, and a concavity 206 or recess on the opposing bottom side 220 of base structure 102. The protrusions 204 of beads 104 may all be on the top side 110 of base structure 102 as illustrated in FIG. 2, or some protrusions 204 may be on the bottom side 220. The cross-section of base structure 102 therefore transitions from a plane of base structure 102, to a protrusion 204 that is out of the plane of base structure 102, and back to the plane of base structure 102. A cross-section that has out-of-plane transitions such as this is stronger than if the cross-section was planar. As is evident in FIG. 2, no additional material is added to base structure 102 to form beads 104.

Figure 3:
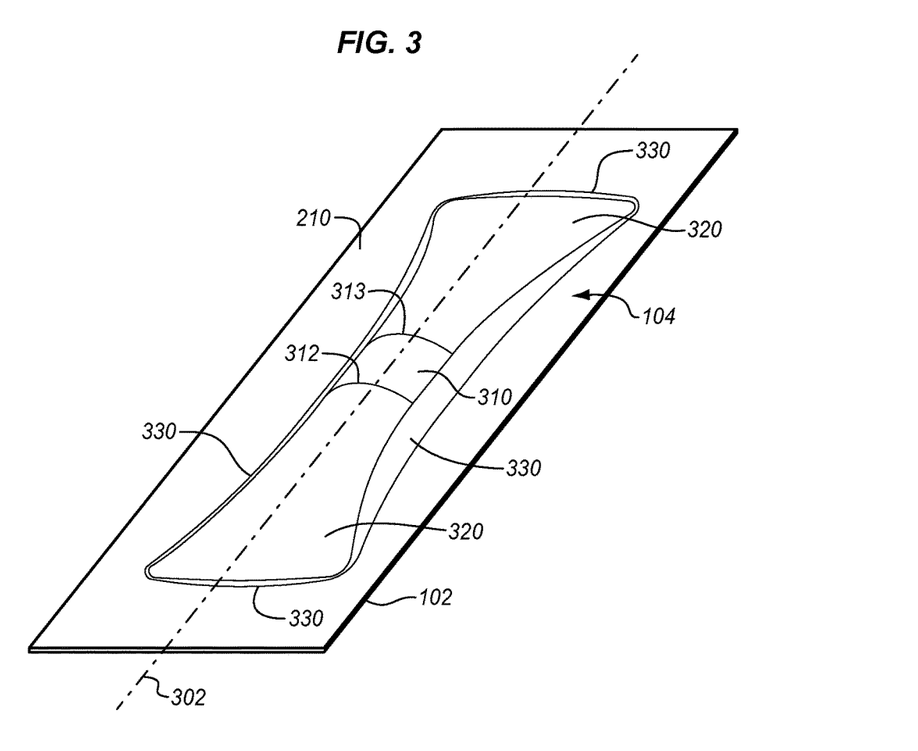
FIG. 3 is a perspective view of a bead in an illustrative embodiment.

FIG. 3 is a perspective view of a bead 104 in an illustrative embodiment. Bead 104 is a continuous structure having an elongated profile in a direction of its longitudinal axis 302. The geometry of bead 104 may be schematically segmented as having a center section 310 and flared sections 320 that together resemble the shape of a bow-tie. Flared sections 320 are symmetric about center section 310 along longitudinal axis 302. The geometry of bead 104 further includes a transition section 330 that transitions from center section 310 and flared sections 320 to the flat surface 210 of base structure 102.

Figure 4:
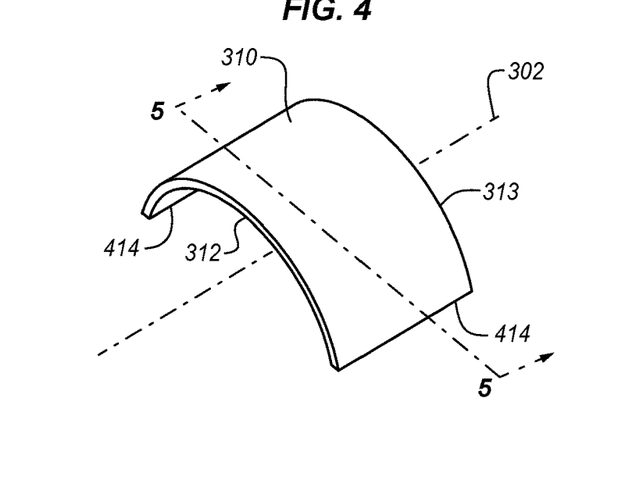
FIG. 4 is a perspective view of a center section in an illustrative embodiment.

FIG. 4 is a perspective view of center section 310 in an illustrative embodiment. Center section 310 has a shape that may be defined as a conic or a conic section, such as circular, elliptical, parabolic, hyperbolic, etc., about longitudinal axis 302. Center section 310 includes ends 312-313 that abut a flared section 320. Center section 310 also includes a base 414 that transitions into flat surface 210 via transition section 330 as described below.

Figure 5:
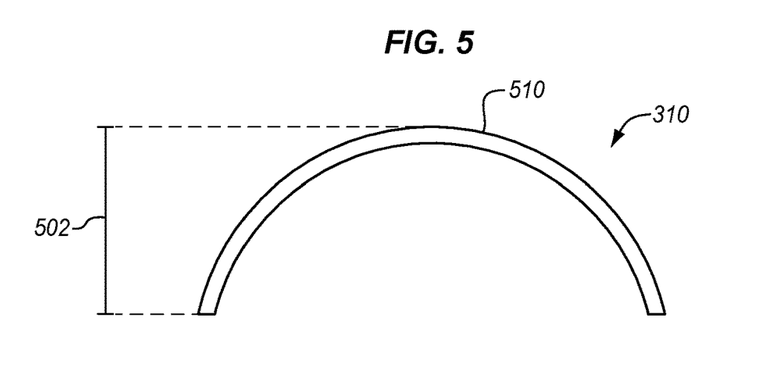
FIG. 5 is a cross-sectional view of the center section in an illustrative embodiment.

FIG. 5 is a cross-sectional view of center section 310 in an illustrative embodiment. The view in FIG. 5 is across cutting plane "5-5" in FIG. 4, and is transverse to longitudinal axis 302. Center section 310 has a height 502, and the transverse shape of center section 310 is defined as a conic. The conic shape of center section 310 is curved along the entire cross-section of center section 310, which defines a smooth outer surface 510.

Figure 6:
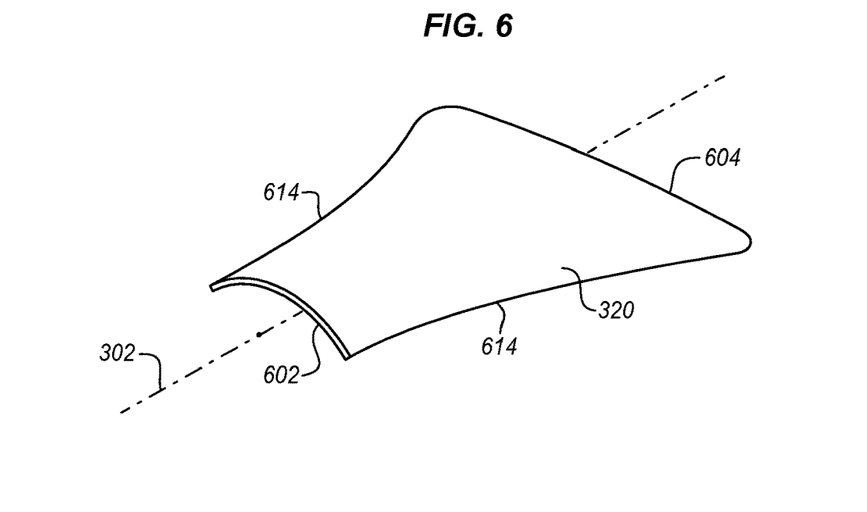
FIG. 6 is a perspective view of a flared section in an illustrative embodiment.

FIG. 6 is a perspective view of a flared section 320 in an illustrative embodiment. Along its length, flared section 320 includes a proximal end 602 that abuts an end 312-313 of center section 310, and a distal end 604 that is opposite proximal end 602 along longitudinal axis 302. The width of flared section 320 increases from proximal end 602 to distal end 604 to give flared section 320 a "flared" profile or trapezoidal profile. This flared profile provides for a bead 104 having a desired strength and contour. Along longitudinal axis 302, the shape of flared section 320 transitions from a conic shape at proximal end 602 to a flat shape at distal end 604, which creates a smooth transition from center section 310 to flat surface 210. Thus, the conic shape of proximal end 602 corresponds with the conic shape of center section 310 at ends 312-313. Flared section 320 is smooth along its length and width, and does not have sharp corners or angularities. In other words, each transverse cross-section of flared section 320 is smooth without sharp breaks, corners, or angularity. Flared section 320 also includes a base 614 that transitions into flat surface 210 via transition section 330 as described below.

Figure 7:
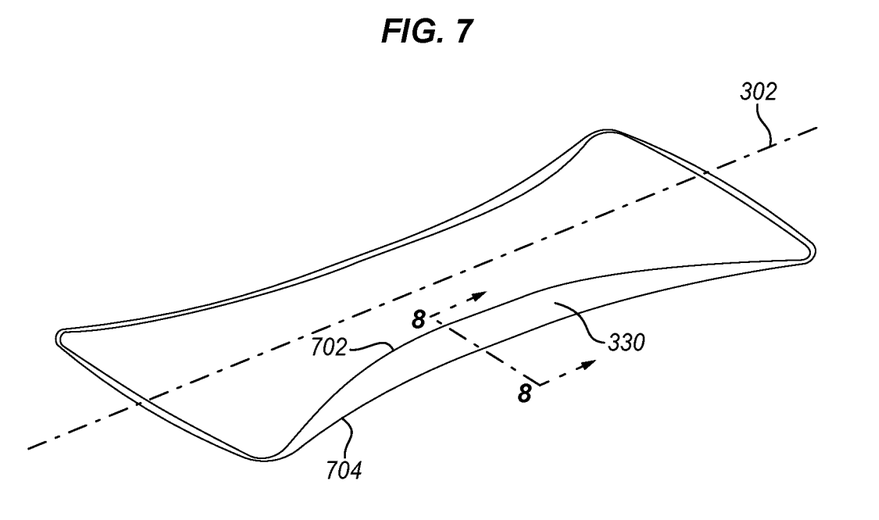
FIG. 7 is a perspective view of a transition section in an illustrative embodiment.
Figure 8:
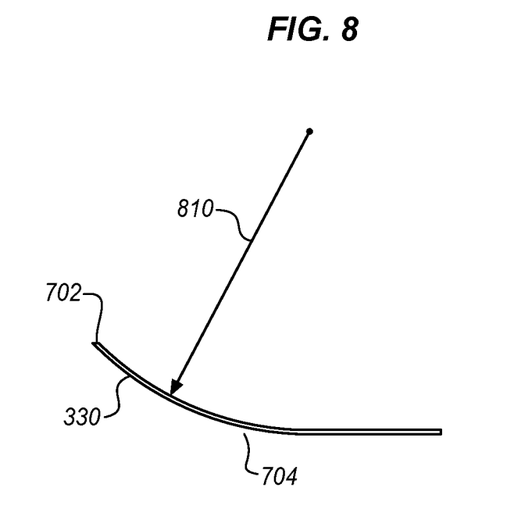
FIG. 8 is a cross-sectional view of the transition section in an illustrative embodiment.

FIG. 7 is a perspective view of transition section 330 in an illustrative embodiment. Transition section 330 includes a top end 702 and a bottom end 704. Top end 702 abuts base 414 of center section 310 and base 614 of flared sections 320. Therefore, top end 702 has a plan view profile that matches the plan view profile of bases 414/614. Bottom end 704 abuts or blends into flat surface 210 of base structure 102 (see FIG. 3). Transition section 330 is curved outward from top end 702 to bottom end 704 to blend with flat surface 210 of base structure 102, which creates a smooth transition from center section 310/flared sections 320 to flat surface 210. FIG. 8 is a cross-sectional view of transition section 330 in an illustrative embodiment. The view in FIG. 8 is across cutting plane "8-8" in FIG. 7, and is transverse to longitudinal axis 302. The curve of transition section 330 may be defined by a radius 810. In one embodiment, radius 810 of transition section 330 may be constant along the length and width of transition section 330, which may be optimized for performance and producibility. In other embodiments, radius 810 may be variable along the length and width of transition section 330.

Figure 9:
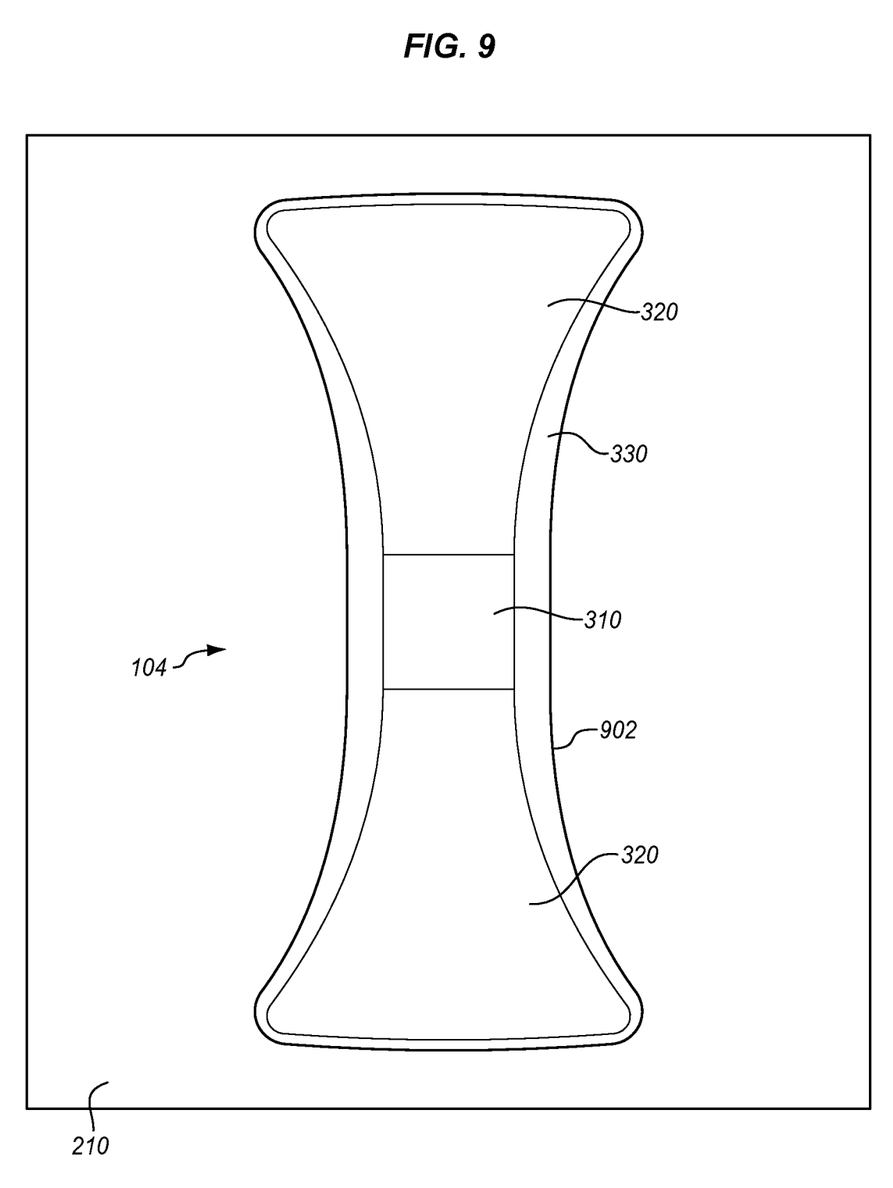
FIG. 9 is a plan view of a bead in an illustrative embodiment.

FIG. 9 is a plan view of bead 104 in an illustrative embodiment. In this plan view (two-dimensions (2D)), the profile 902 or outline of bead 104 on flat surface 210 resembles a bow-tie. Also, profile 902 of bead 104 may be defined as curvilinear or smooth, and devoid of angularities. This reduces or limits stress concentrations along the interface between bead 104 and flat surface 210.

Figure 10:
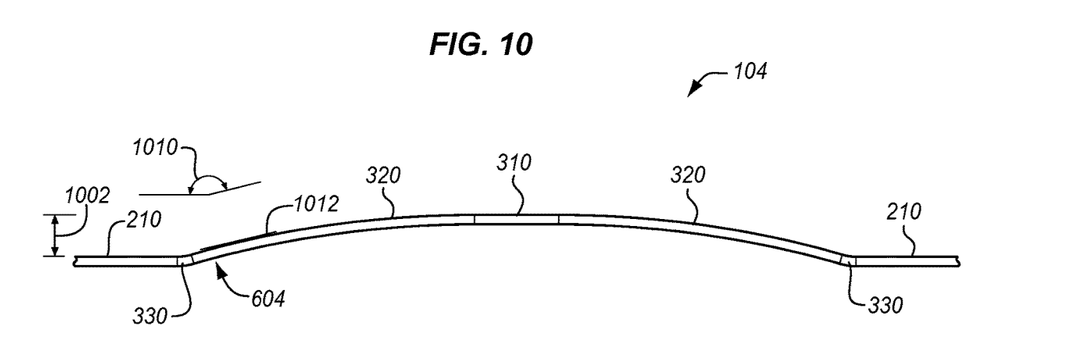
FIG. 10 is a side view of a flared section in an illustrative embodiment.

FIG. 10 is a cross-sectional view of bead 104 in an illustrative embodiment. The view in FIG. 10 is a cross-section along longitudinal axis 302 in FIG. 3. A height 1002 of bead 104 in relation to flat surface 210 is at a maximum at center section 310. Height 1002 decreases from center section 310, along flared sections 320, and to where transition section 330 blends into flat surface 210. In one embodiment, a maximum slope of a tangential plane 1012 of flared sections 320 is in the range of 10-20 degrees in relation to flat surface 210 (as indicated by angle 1010) along longitudinal axis 302. For example, a tangential plane 1012 of a flared section 320 nearest to transition section 330 or flat surface 210 may slope at an angle of about 14 degrees. Tangential planes 1012 further away from transition section 330 or flat surface 210 along longitudinal axis 302 have a decreasing slope. With flared sections 320 having a maximum slope such as this, bead 104 adds a desired stiffness to beaded panel 100 while allowing for a smooth transition between flared sections 320 and flat surface 210 (via transition section 330) without defining a sharp corner that may be prone to cracking.

Figure 11:
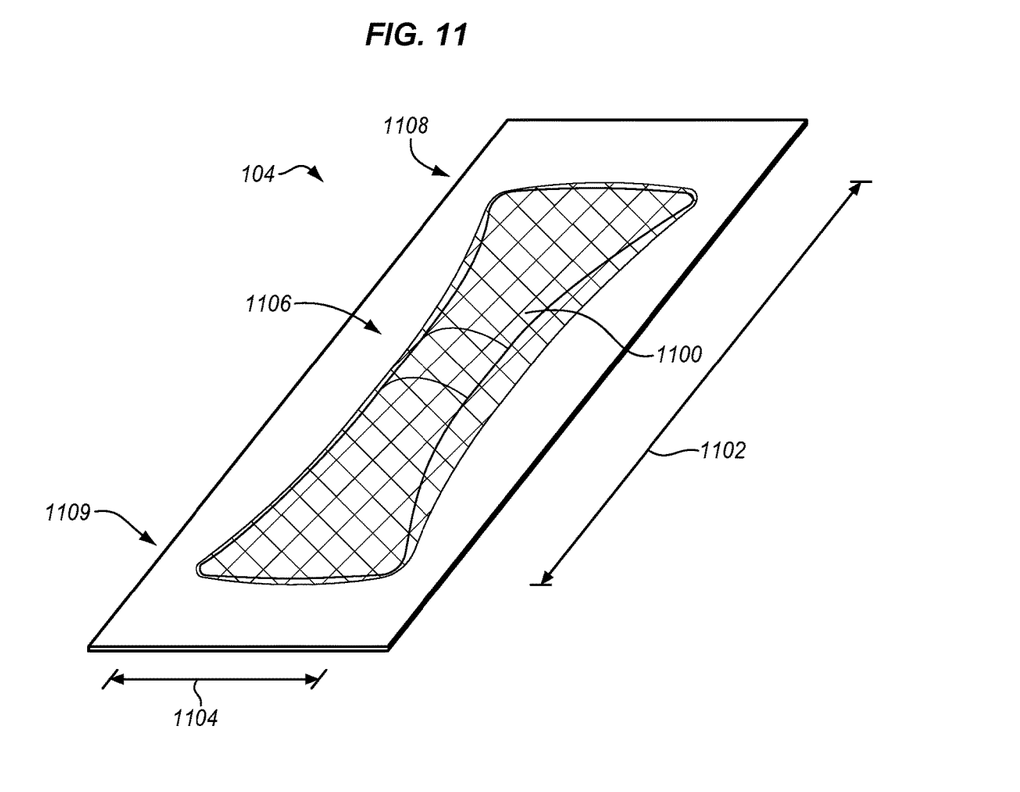
FIG. 11 is a perspective view of bead 104 in an illustrative embodiment.

FIG. 11 is another perspective view of bead 104 in an illustrative embodiment. Along a length 1102 of bead 104, the width 1104 increases from the middle region 1106 to opposing end regions 1108-1109 to resemble the bow-tie shape. Due to the shape of center section 310, flared sections 320, and transition section 330, the entire outer surface 1100 or contour of bead 104 is smooth. In other words, outer surface 1100 (shown as a hatched region) in 3D is continuously smooth along the entirety of the length 1102 and width 1104 of bead 104, and does not have angularities, corners, or edges where two or more planar surfaces intersect. With a smooth outer surface 1100 such as this, potential stress points are avoided on bead 104, and the shape of bead 104 is reproducible with a variety of materials, such as composite materials.

Figure 12:
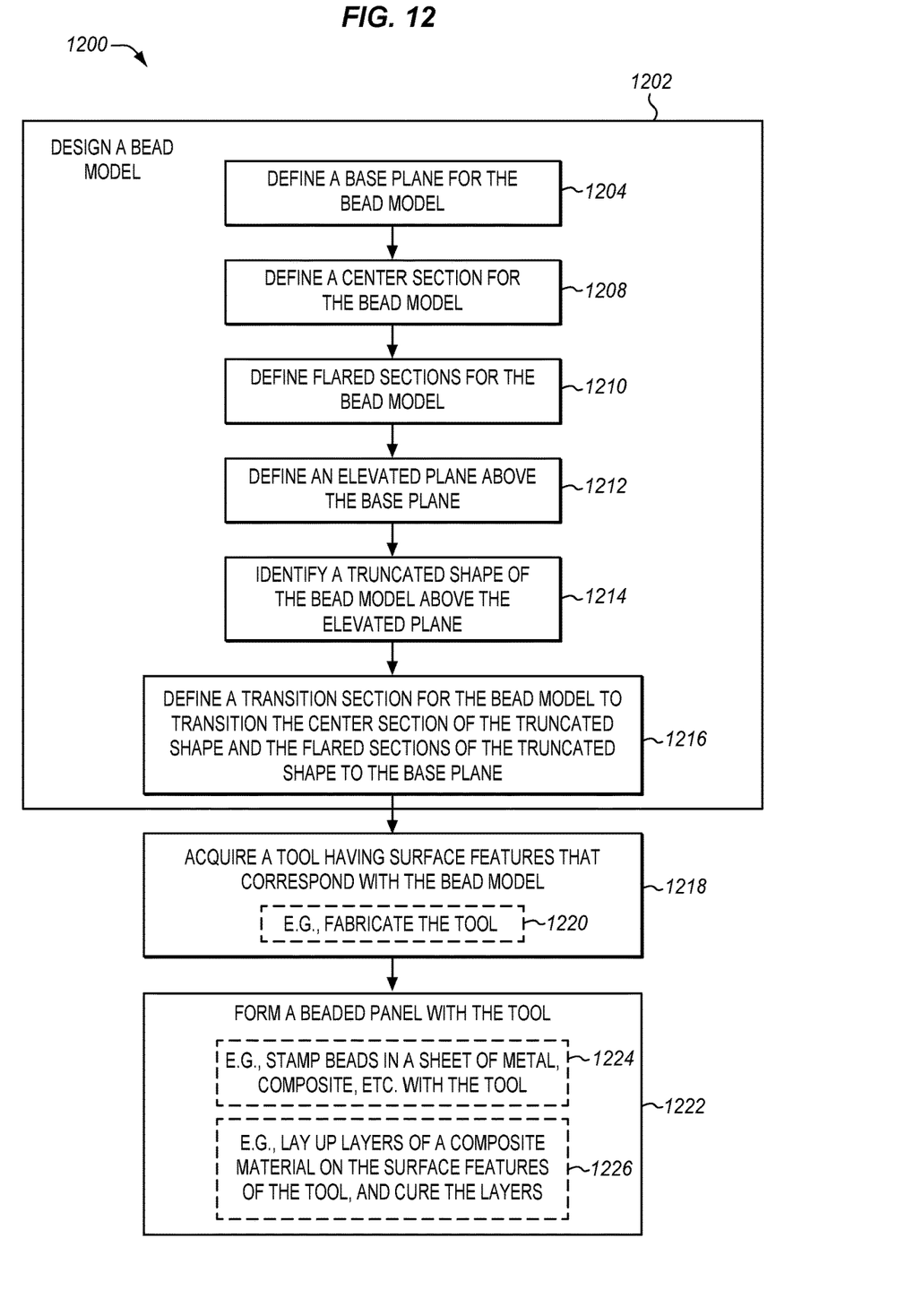
FIG. 12 is a flow chart illustrating a method of forming a beaded panel in an illustrative embodiment.

FIG. 12 is a flow chart illustrating a method 1200 of forming a beaded panel in an illustrative embodiment. The steps of method 1200 will be described with reference to beaded panel 100 in FIGS. 1-11, but those skilled in the art will appreciate that method 1200 may be performed to form other beaded panels. Also, the steps of the flow charts described herein are not all inclusive and may include other steps not shown, and the steps may be performed in an alternative order.

Figure 13:
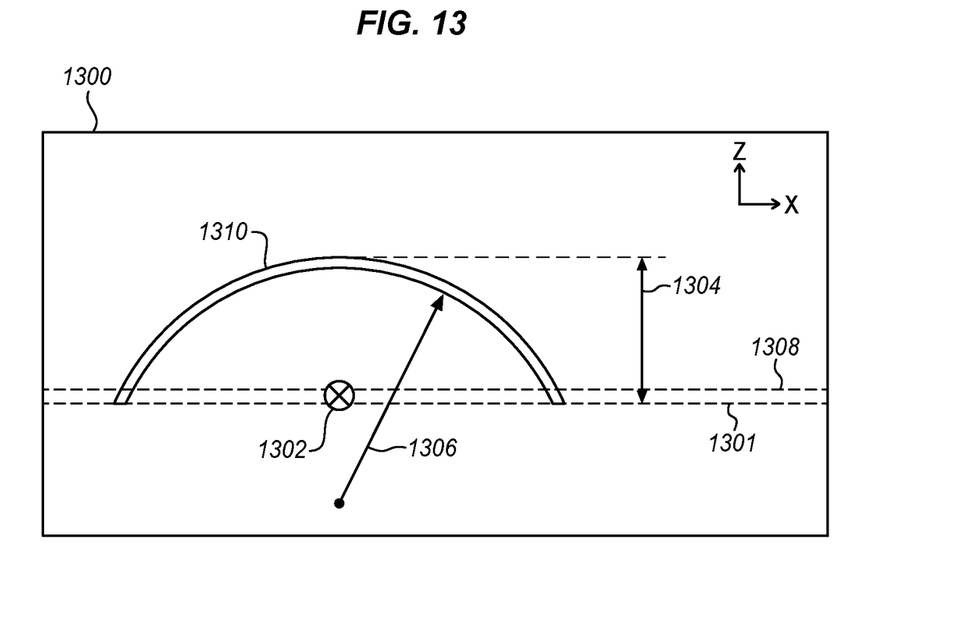
FIG. 13 is a cross-sectional view of bead model in an illustrative embodiment.
Figure 14:
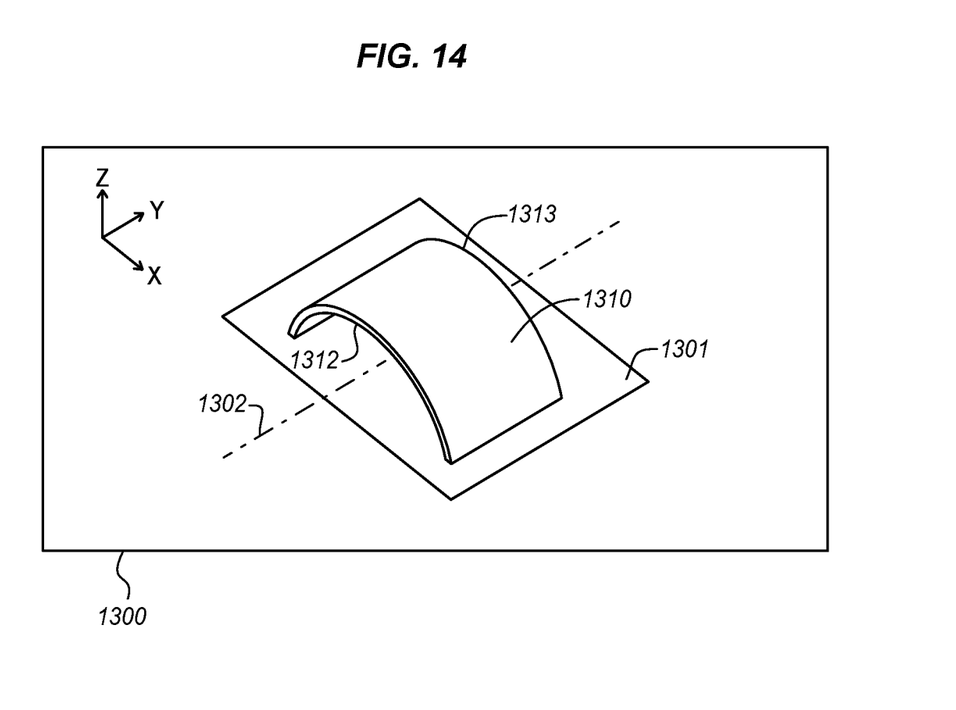
FIG. 14 is a perspective view of the bead model with a center section in an illustrative embodiment.

Method 1200 begins with designing a bead model in 3D (step 1202). A bead model (e.g., a Computer-Aided Design (CAD) model) may be used by a designer to specify the parameters (e.g., length, width, height, shape, etc.) of a bead. In designing a bead model, a base plane is defined for the bead model (step 1204). A center section is defined, added, or created for the bead model (step 1208) in relation to the base plane. FIG. 13 is a cross-sectional view of the bead model in an illustrative embodiment. As is shown in FIG. 13, center section 1310 of bead model 1300 has a conic shape that is symmetric on base plane 1301 about a longitudinal axis 1302 (into and out of the page in the y-direction). In the example shown in FIG. 13, center section 1310 is semicircular with a radius 1306 that is constant along its cross-section, which creates a smooth contour along an outer surface of center section 1310. A height 1304 of center section 1310 is defined in relation to base plane 1301. The height 1304 of center section 1310, the conic shape of center section 1310, the length of center section 1310, etc., may be optimized for stiffening effectiveness of a bead. FIG. 14 is a perspective view of bead model 1300 with center section 1310 in an illustrative embodiment. Center section 1310 has ends 1312-1313 that will abut flared sections as described below.

Figure 15:
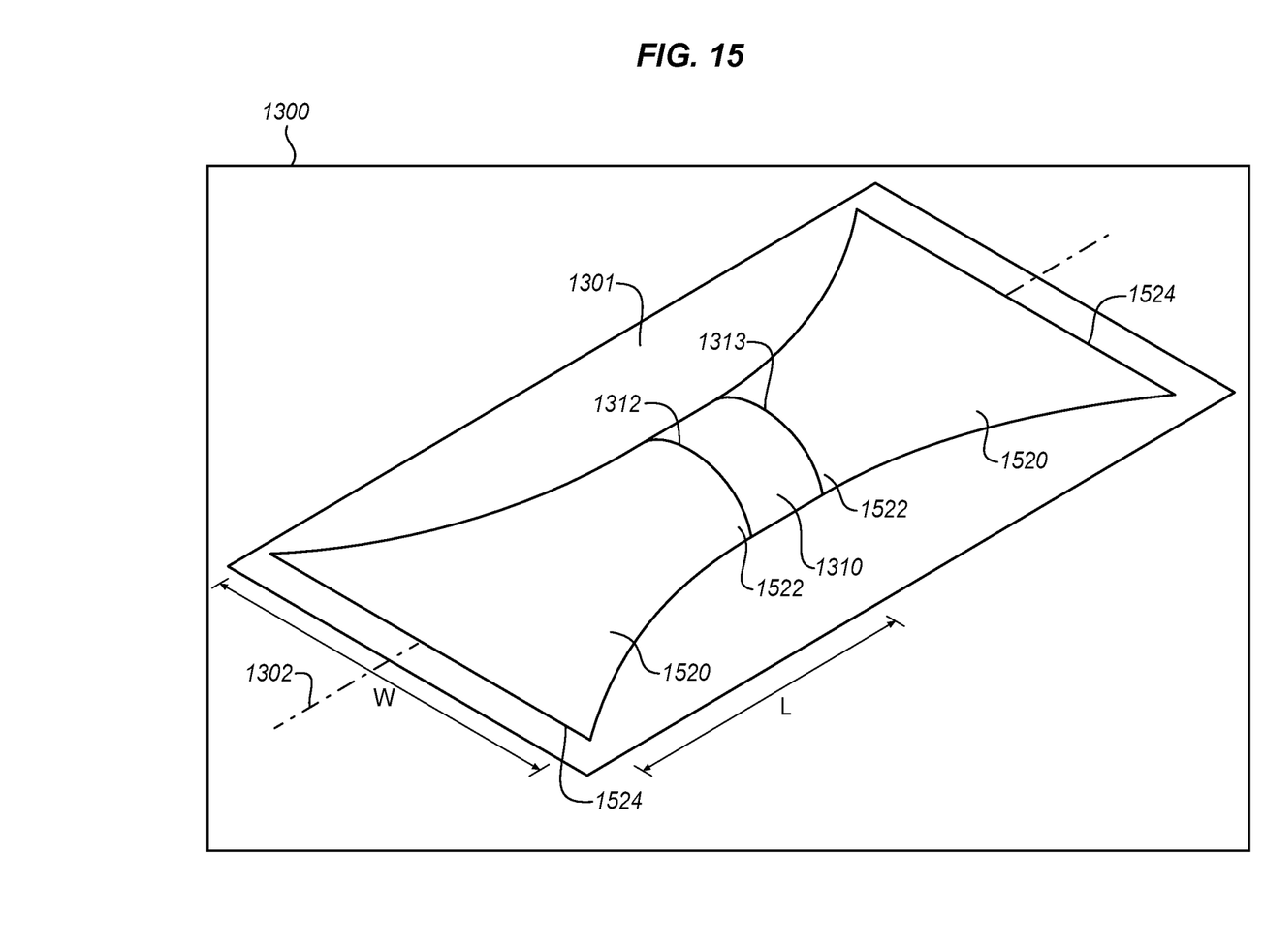
FIG. 15 is a perspective view of the bead model with flared sections in an illustrative embodiment.

In FIG. 12, flared sections are defined, added, or created for bead model 1300 in relation to base plane 1301 (step 1210). FIG. 15 is a perspective view of bead model 1300 with flared sections in an illustrative embodiment. Flared sections 1520 are symmetric about center section 1310 along the longitudinal axis 1302 of bead model 1300. Flared sections 1520 extend from opposing ends 1312-1313 of center section 1310 to the base plane 1301 along length L.

The width W of flared sections 1520 increases from proximal end 1522 to distal end 1524 to give flared sections 1520 a "flared" profile or trapezoidal profile. The "L" and "W" dimensions may be modified to optimize local stresses in a bead and a beaded panel. Along longitudinal axis 1302, the shape of flared sections 1520 transitions from a conic shape at proximal end 1522 to a flat shape at distal end 1524. Thus, the conic shape of proximal end 1522 corresponds with the conic shape of center section 1310. Also, flared sections 1520 slope upward from distal end 1524 to proximal end 1522 along longitudinal axis 1302. In one embodiment, flared sections 1520 may have a maximum slope in the range of 10-20 degrees along the longitudinal axis 1302. In this step, flared sections 1520 may be blended into base plane 1301 with points or corners as shown in FIG. 15.

Figure 16:
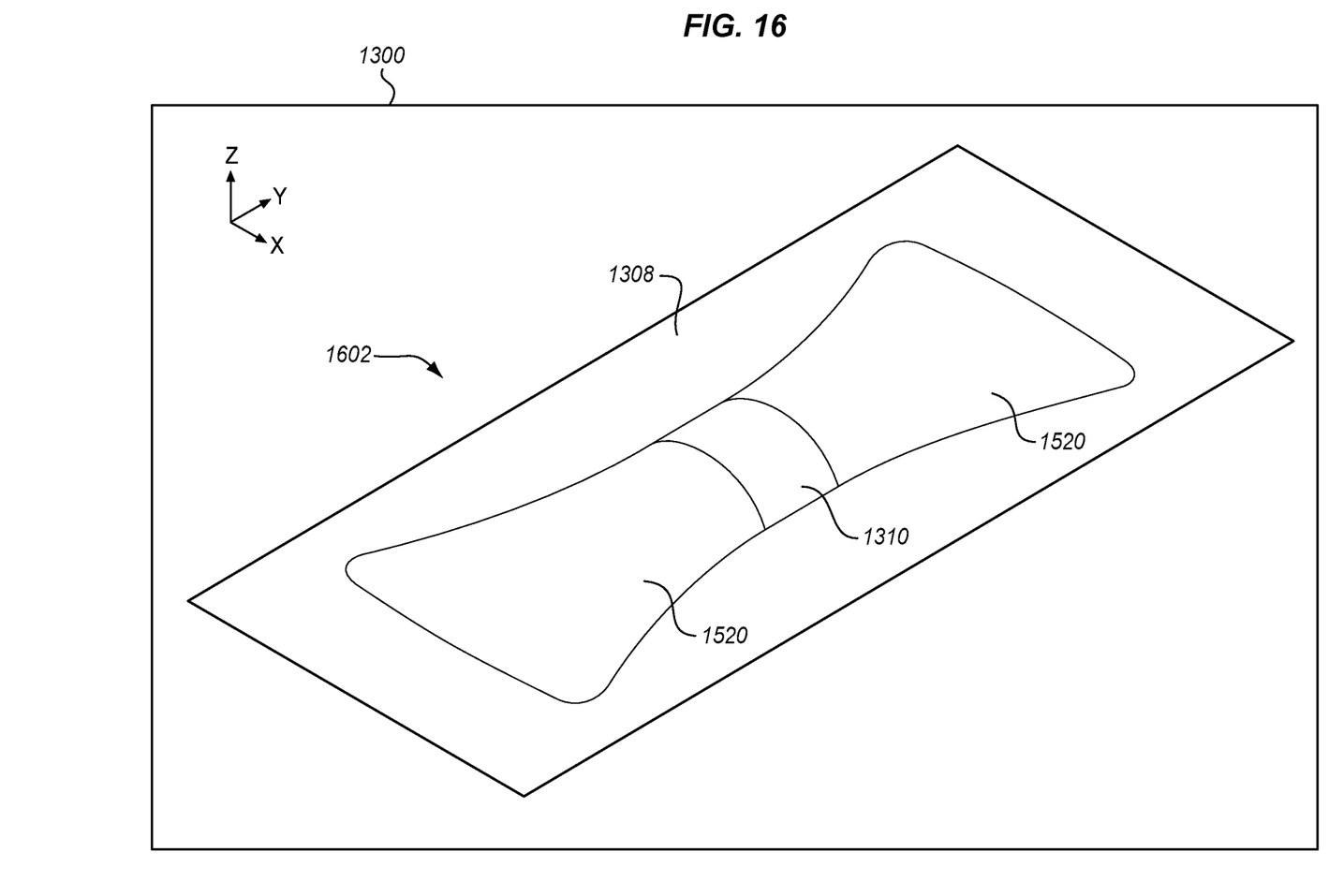
FIG. 16 is a perspective view of a truncated shape of the bead model in an illustrative embodiment.

In FIG. 12, an elevated plane 1308 is defined (see FIG. 13) for bead model 1300 that is above base plane 1301 (step 1212) in the z-direction. A truncated shape of bead model 1300 is identified as the 3D shape above elevated plane 1308 (step 1214). Elevated plane 1308 is raised a percentage from base plane 1301 to create the truncated shape as desired. FIG. 16 is a perspective view of a truncated shape 1602 of bead model 1300 in an illustrative embodiment. Elevated plane 1308 acts to mask the lower portion of bead model 1300 to define the truncated shape 1602 of bead model 1300. In the truncated shape 1602, center section 1310 of bead model 1300 resembles center section 310 of bead 104 (see FIG. 3), and flared sections 1520 of bead model 1300 resemble flared sections 320 of bead 104. Truncated shape 1602 also defines base 414 of center section 310 and base 614 of flared sections 320 (see FIGS. 4 and 6).

Figure 17:
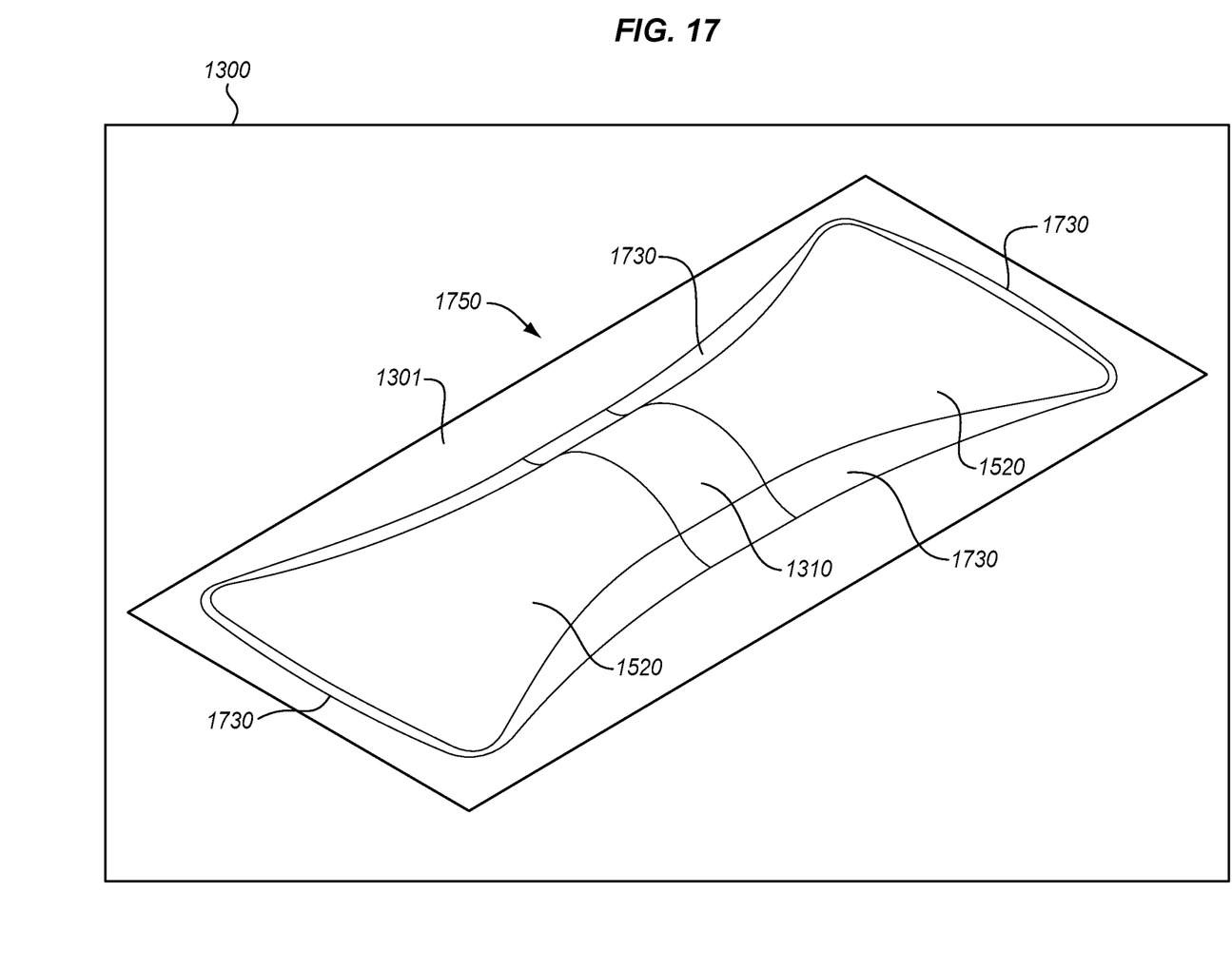
FIG. 17 is a perspective view of the bead model with a transition section in an illustrative embodiment.

In FIG. 12, a transition section is defined, added, or created for bead model 1300 to transition center section 1310 of truncated shape 1602 and flared sections 1520 of truncated shape 1602 to base plane 1301 (step 1216) or another plane as desired. FIG. 17 is a perspective view of bead model 1300 with transition section 1730 in an illustrative embodiment. Transition section 1730 is curved outward from center section 1310 and flared sections 1520 of truncated shape 1602 (see FIG. 16) to base plane 1301, which creates a smooth transition from center section 1310/flared sections 1520 to base plane 1301. In one embodiment, the curve of transition section 1730 may have a constant radius along the length and width of transition section 1730, which may be optimized for performance and producibility. In other embodiments, the radius of curvature of transition section 1730 may be variable. With transition section 1730 defined, the final form 1750 of bead model 1300 is defined.

Bead model 1300 (in final form 1750) may then be used to fabricate a beaded panel 100 that includes beads 104. In FIG. 12, a tool is acquired having surface features that correspond with or match bead model 1300 (step 1218). The tool may vary depending on the type of fabrication process used and the type of material selected for beaded panel 100. For example, the tool may comprise a stamping tool or stamping press that has one or more dies with surface features that match bead model 1300. In another example, the tool may comprise a mold having surface features that match bead model 1300, such as for laying up layers of a composite material. In one embodiment, the surface features may be fabricated on the tool based on bead model 1300 (optional step 1220). Fabricating a tool based on bead model 1300, such as with a Computer Numerical Control (CNC) machine or other machine, a 3D printer, etc., allows a designer to precisely control the shape of the beads formed for a beaded panel.

The beaded panel (e.g., beaded panel 100) is fabricated, manufactured, or otherwise formed using the tool to include one or more beads that match bead model 1300 (step 1222). Formation of the beaded panel may again depend on the type of tool and the material used for the beaded panel. In one embodiment, the beaded panel may be formed by stamping the beads in a sheet of metal material, a sheet of composite material, or a sheet of another type of material with the tool (optional step 1224). For example, a base structure or a web may be placed in the tool, and the tool may stamp the beads in the base structure to form a beaded panel, such as beaded panel 100. In another embodiment, the beaded panel may be formed by laying up one or more layers of a fiber-reinforced composite material on the surface features of the tool, and curing the layers of the fiber-reinforced composite material to form the beads in the fiber-reinforced composite material (optional steps 1226). The smooth contour of the surface features of the tool (based on bead model 1300) consequently forms beads (e.g., bead 104) in the beaded panel that have a smooth contour. One benefit is that the beads do not have any angles or sharp corners that create stress points when an out-of-plane force is applied to the beaded panel. These types of stress points may lead to cracking of the beaded panel. Another benefit is that a smooth bead shape may be effectively formed in materials that have higher tensile strength, such as composite materials.

Figure 18:
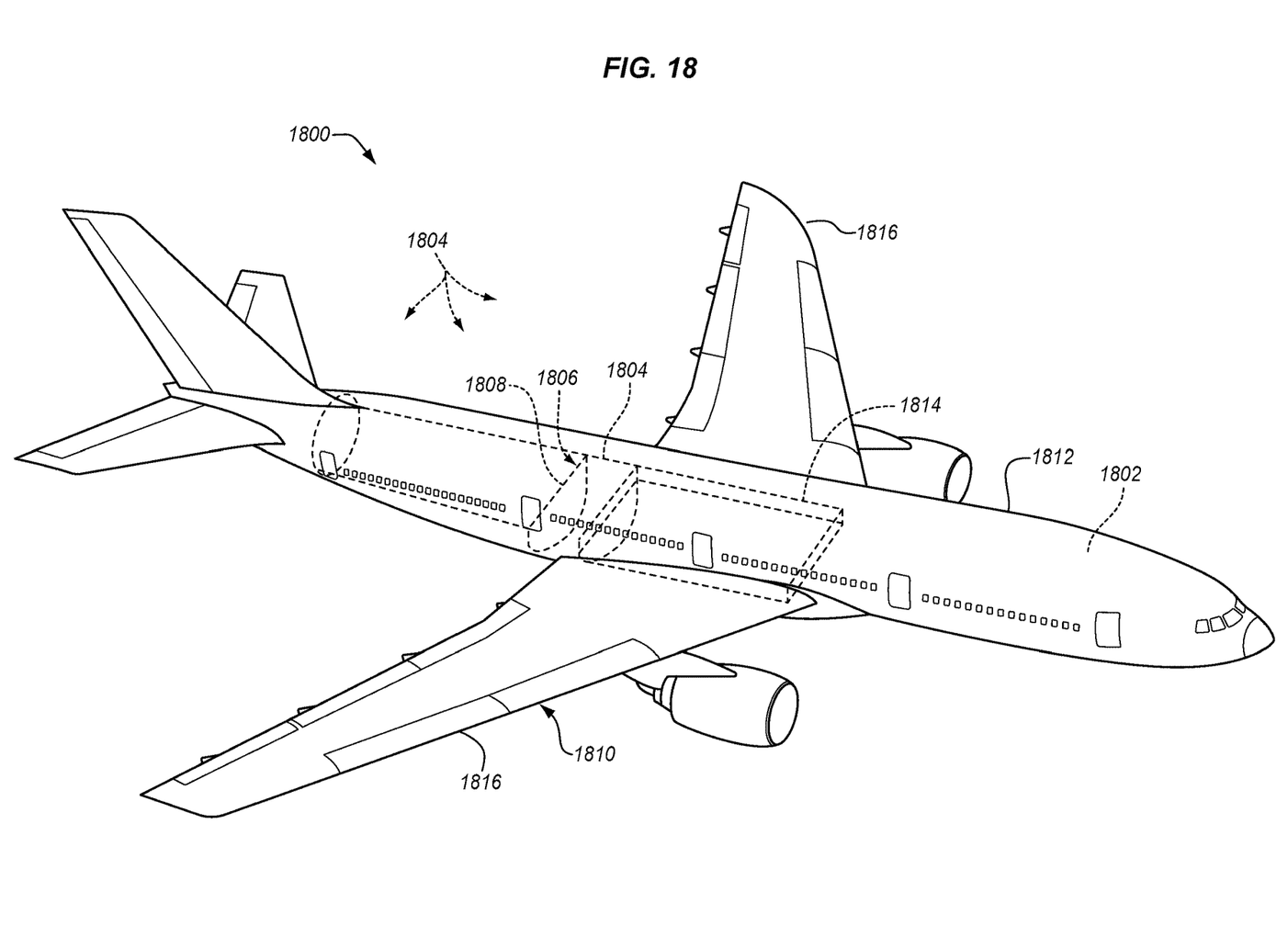
FIG. 18 is a schematic diagram of an aircraft in an illustrative embodiment.

A beaded panel 100 as described herein may be used in a variety of applications. In one embodiment, beaded panel 100 may be installed or implemented as a structural element (e.g., a pressure panel) of an aircraft. FIG. 18 is a schematic diagram of an aircraft 1800 in an illustrative embodiment. The embodiment in FIG. 18 is an example of an aerospace application that may utilize pressure panels. However, pressure panels may be used in other aerospace applications, such as rotorcraft and space vehicles, and non-aerospace applications, such as submarines.

Aircraft 1800 may include one or more pressurized compartments 1802 for such purposes as comfort of operators and passengers, and for protection of cargo and equipment. Aircraft 1800 may include pressure panels 1804 to isolate and maintain the integrity of pressurized compartments 1802 within aircraft 1800. Pressure panels 1804 are subject to the pressure differential of pressurized compartment 1802 relative to neighboring compartments and/or ambient conditions. Further, pressure panels 1804 may be subject to loads and/or deformation transmitted by other components of the vehicle. Such loads and/or deformation may have their ultimate source in the weight of the vehicle and the lift of the vehicle.

Aircraft 1800 may further include unpressurized compartments, such as mechanical compartments 1806 for equipment that requires no pressurization. Pressure panels 1804 may be used to separate pressurized and unpressurized compartments. One type of unpressurized compartment is a wheel well 1808. On some aircraft 1800, the wheel well 1808 is located near where the wing 1810 meets the fuselage 1812. Wheel well 1808 may be adjacent or under fuselage 1812 and/or may be defined by fuselage 1812, and may be under or aft wing 1810. Other configurations also are within the scope of aircraft 1800.

Additionally or alternatively, in some aircraft 1800, compartments may not be actively pressurized by a pressurization system, yet compartment walls may still be subject to pressure differentials during flight, simply due to the change in altitude and/or forces of flight, and thus external air pressure may be greater or less than internal pressure. For example, some aircraft typically do not include active pressurization systems to maintain an elevated pressure within a compartment (e.g., a cargo compartment), yet pressure differentials, including positive and/or negative pressure differentials, may be imparted between the exterior of a compartment and the interior of a compartment during flight.

Wing 1810 of an aircraft 1800 typically includes a wing center section 1814, which may pass through or under fuselage 1812, and two outboard wing sections 1816. In flight, wing 1810 creates lift which counteracts the weight of aircraft 1800. Because the lift is distributed along the outboard wing sections 1816, wing 1810 is subject to stress. Stress is caused by an external force, such as lift and weight, and is a structure's resistance, or counter force that opposes deformation.

Under the stress of flight, wing 1810 bends, subjecting the upper portion to compression and the lower portion to tension. Components closely coupled to wing 1810 are thus deformed under the displacement imposed by wing 1810 during flight. For example, where wheel well 1808 is adjacent to wing 1810, a portion of wheel well 1808 may be compressed with the upper portion of wing 1810. When pressure panels 1804 are used to form a portion of such a wheel well 1808, the pressure panels 1804 may be subject to the displacement of wing 1810, and thus subject to compression as well as the pressure differential between wheel well 1808 and the pressurized compartment 1802.

Although specific embodiments were described herein, the scope is not limited to those specific embodiments. Rather, the scope is defined by the following claims and any equivalents thereof.

What is claimed is:

1. A beaded panel comprising:
a base structure comprising a sheet of material; and
beads that comprise a protrusion on a first side of the base structure, and a concavity on an opposing second side of the base structure;
wherein a geometry of the beads comprises:
a center section having a transverse cross-section of a conic shape;
flared sections symmetric about the center section along a longitudinal axis, wherein each transverse cross-section of the flared sections is smooth; and
a transition section that curves outward from a base of the center section and the flared sections to blend with a flat surface on the first side of the base structure; wherein an entire profile of the beads on the flat surface in plan view is curvilinear, absent angularities.

2. The beaded panel of claim 1 wherein:
the flared sections include a proximal end that abuts an end of the center section, and a distal end that is opposite the proximal end; and
a width of the flared sections increases from the proximal end to the distal end.

3. The beaded panel of claim 2 wherein:
the flared sections transition from a conic shape at the proximal end to a flat shape at the distal end.

4. The beaded panel of claim 3 wherein:
the conic shape of the proximal end of the flared sections corresponds with the conic shape of the center section.

5. The beaded panel of claim 1 wherein:
a tangential plane of the flared sections has a maximum slope in a range of 10-20 degrees in relation to the flat surface along the longitudinal axis.

6. The beaded panel of claim 1 wherein:
a radius of curvature of the transition section is constant along a length and width of the transition section.

7. The beaded panel of claim 1 wherein:
the material comprises a fiber-reinforced composite material.

8. The beaded panel of claim 1 wherein:
the beaded panel is installed in an aircraft.

9. A beaded panel comprising:
a base structure comprising a sheet of material; and
beads that comprise a protrusion on a first side of the base structure, and a concavity on an opposing second side of the base structure;
wherein along a length of the beads, a width of the beads increases from a middle region to opposing end regions to resemble a bow-tie shape;
wherein an outer surface of the beads in three-dimensions is continuously smooth along the entirety of the length and the width of the beads;
wherein an entire profile of the beads in plan view is curvilinear, absent angularities.

10. The beaded panel of claim 9 wherein:
a geometry of the beads comprises:
a center section having a conic shape;
flared sections symmetric about the center section along the length of the beads; and
a transition section that curves outward from a base of the center section and the flared sections to blend with a flat surface on the first side of the base structure.

11. The beaded panel of claim 10 wherein:
a tangential plane of the flared sections has a maximum slope in a range of 10-20 degrees in relation to the flat surface along the length of the beads.

12. The beaded panel of claim 10 wherein:
the flared sections transition from a conic shape to a flat shape along the length of the beads.

13. The beaded panel of claim 9 wherein:
the material comprises a fiber-reinforced composite material.

14. The beaded panel of claim 9 wherein:
the beaded panel is installed in an aircraft.

15. A method of forming a beaded panel, the method comprising:
designing a bead model in three-dimensions for beads of the beaded panel by:
defining a base plane for the bead model;
defining a center section for the bead model having a transverse cross-section of a conic shape that is symmetric on the base plane about a longitudinal axis, and having a height in relation to the base plane;
defining flared sections for the bead model in relation to the base plane that are symmetric about the center section along the longitudinal axis, wherein each transverse cross-section of the flared sections is smooth;
defining an elevated plane above the base plane;
identifying a truncated shape of the bead model above the elevated plane; and
defining a transition section for the bead model to transition the center section of the truncated shape and the flared sections of the truncated shape to the base plane, wherein the transition section curves outward from a base of the center section and the flared sections to blend with the base plane;
acquiring a tool having surface features that correspond with the bead model; and
forming the beaded panel in a sheet of material using the tool.

wherein the beaded panel includes a base structure comprising the sheet of material, and the beads that comprise a protrusion on a first side of the base structure and a concavity on an opposing second side of the base structure;

wherein along a length of the beads, a width of the beads increases from a middle region to opposing end regions to resemble a bow-tie shape;

wherein an outer surface of the beads in three-dimensions is continuously smooth along the entirety of the length and the width of the beads;

wherein an entire profile of the beads in plan view is curvilinear, absent angularities.

16. The method of claim 15 wherein acquiring the tool comprises:
fabricating the surface features on the tool based on the bead model.

17. The method of claim 15 wherein forming the beaded panel comprises:
stamping the beads in a sheet of metal material with the tool.

18. The method of claim 15 wherein forming the beaded panel comprises:
stamping the beads in a sheet of a fiber-reinforced composite material with the tool.

19. The method of claim 15 wherein forming the beaded panel comprises:
laying up one or more layers of a fiber-reinforced composite material on the surface features of the tool, and curing the layers of the fiber-reinforced composite material.

20. The beaded panel of claim 10 wherein:
the conic shape of the center section is curved along an entire cross-section transverse to the length of the beads.

* * * * *